(12) United States Patent
Rofner et al.

(10) Patent No.: US 7,374,372 B2
(45) Date of Patent: May 20, 2008

(54) INDEXABLE INSERT

(75) Inventors: Rudolf Rofner, Heiterwang (AT); Harald Urschitz, Breitenwang (DE); Remus Venturini, Rosshaupten (DE)

(73) Assignee: Ceratizit Austria GmbH, Reutte (AT)

( * ) Notice: Subject to any disclaimer, the term of this patent is extended or adjusted under 35 U.S.C. 154(b) by 0 days.

(21) Appl. No.: 11/853,476

(22) Filed: Sep. 11, 2007

(65) Prior Publication Data

US 2008/0008545 A1    Jan. 10, 2008

Related U.S. Application Data

(63) Continuation of application No. PCT/AT2006/000100, filed on Mar. 9, 2006.

(30) Foreign Application Priority Data

Mar. 11, 2005  (AT) ................... GM149/2005 U

(51) Int. Cl.
  B23B 27/16  (2006.01)
  B23C 5/20  (2006.01)
(52) U.S. Cl. ............... 407/113; 407/114; 407/115; 407/116
(58) Field of Classification Search ........... 407/113, 407/114, 115, 116, 117, 119, 120, 11, 43, 407/66, 67
See application file for complete search history.

(56) References Cited

U.S. PATENT DOCUMENTS

| 5,044,840 | A | * | 9/1991 | Fouquer et al. ............ 407/114 |
| 5,116,167 | A | | 5/1992 | Niebauer |
| 5,695,303 | A | * | 12/1997 | Boianjiu et al. ............ 407/114 |
| 5,743,681 | A | * | 4/1998 | Wiman et al. ............ 407/114 |
| 6,786,682 | B1 | * | 9/2004 | Wiman ................... 407/114 |
| 2002/0094245 | A1 | | 7/2002 | Schlemmer et al. |
| 2004/0045426 | A1 | | 3/2004 | Ishida |

FOREIGN PATENT DOCUMENTS

| DE | 42 01 112 A1 | 7/1993 |
| EP | 0 494 646 A1 | 7/1992 |
| EP | 0 642 859 A1 | 3/1995 |
| WO | 93/13899 | 7/1993 |

* cited by examiner

Primary Examiner—Willmon Fridie, Jr.
(74) Attorney, Agent, or Firm—Laurence A. Greenberg; Werner H. Stemer; Ralph E. Locher

(57) ABSTRACT

A polygonal indexable insert has cutting edges that run rectilinearly or in a curved manner in a plane perpendicular to a locating surface and that fall from cutting corners having acute angles to cutting corners with obtuse angles following one another alternately. The cutting edges have a rake face which first of all falls and then rises with a back region. The back region together with a center part of the indexable insert forms an intersection curve. The intersection curve lies at a distance a from the starting point of the associated cutting edge in the region of the cutting corners in each case at their intersection with the angle bisector. It is at a distance b from the end point of the associated cutting edge in the region of the cutting corners in each case at their intersection with the angle bisector. The distance b is greater than the distance a.

10 Claims, 4 Drawing Sheets

INDEXABLE INSERT

CROSS-REFERENCE TO RELATED APPLICATION

This is a continuing application, under 35 U.S.C. § 120, of copending international application PCT/AT2006/000100, filed Mar. 9, 2006, which designated the United States; this application also claims the priority, under 35 U.S.C. § 119, of Austrian application GM 149/2005, filed Mar. 11, 2005; the prior applications are herewith incorporated by reference in their entirety.

BACKGROUND OF THE INVENTION

Field of the Invention

The invention relates to a polygonal indexable insert having a flat locating surface and cutting edges on the top side which are connected to one another by two or more cutting corners having acute and obtuse angles, following one another alternately, of less than 89° and respectively more than 91°. The cutting edges run rectilinearly or in a curved manner relative to the flat locating surface in such a way that a thickness d of the indexable insert at the cutting corners having an acute angle is greater than a thickness d' at the cutting corners having an obtuse angle.

Such a rhombic or rhomboidal indexable insert is described in commonly assigned, European published patent application EP 0 642 859 A. In that indexable insert the cutting edges merge directly into a rake face which first of all falls and then rises with respect to the locating surface and forms together with a central center region of the indexable insert a wavelike intersection curve. The central center region in this case is designed to be flat and parallel to the locating surface and lies overall above the highest point of the cutting edges. This results in a sharply rising chip breaker groove in particular in the cutting corner region having the smaller indexable insert thickness. On account of this special geometry of the chip breaker groove, pronounced deformation of the chips occurs at higher feed rates during the cutting, a factor which leads in turn to very large cutting forces, which have an adverse effect on the surface quality, tool life and dimensional accuracy due to vibrations which occur. On account of inadequate chip control, chipping of the cutting edges also occurs increasingly.

SUMMARY OF THE INVENTION

It is accordingly an object of the invention to provide an indexable insert, which overcomes the above-mentioned disadvantages of the heretofore-known devices and methods of this general type and which can also be used at higher feed rates without premature damage to the cutting edges and reduced surface quality occurring.

With the foregoing and other objects in view there is provided, in accordance with the invention, a polygonal indexable insert, comprising:

a flat locating surface and cutting edges on a top side connected to one another by two or more cutting corners having acute angles of less than 89° and obtuse angles of more than 91° following one another alternately, said cutting edges running rectilinearly or curved relative to said flat locating surface to define a thickness d of the indexable insert at said cutting corners having an acute angle greater than a thickness d' of the indexable insert at said cutting corners having an obtuse angle;

in a plan view, said cutting edges merging into a rake face which, with respect to said flat locating surface, first falls inward and then rises with a slope region and then forms an intersection curve together with a center part of the indexable insert, said intersection curve running at a distance a from a starting point of the associated said cutting edge in a region of said cutting corners having the acute angle in each case at their intersection with the angle bisector and at a distance b from an end point of the associated said cutting edge in the region of said cutting corners having the obtuse angle in each case at their intersection with the angle bisector, the distance b being greater than the distance a;

an imaginary straight connecting line between said intersections, if the associated said cutting edge runs rectilinearly in a plane perpendicular to said flat locating surface, having a maximum angular deviation of 5° from said cutting edge in said plane or, if the associated said cutting edge runs in a curved manner in said plane perpendicular to said flat locating surface, having a maximum angular deviation of 5° from an imaginary straight connecting line of said starting point and said end point of said cutting edge in said plane; and wherein said intersection, with respect to said flat locating surface, lies at an equal height as said starting point of said cutting edge or lies deeper than said starting point by no more than a maximum of 6% of a length of the associated said cutting edge.

In other words, the objects of the invention are achieved in that, as seen in plan view, the cutting edges merge into a rake face which, with respect to the locating surface of the insert, first of all falls and in continuation rises with a back region and which then forms together with a center part of the indexable insert an intersection curve which, in plan view, runs in such a way that it is at a distance a from the starting point of the associated cutting edge in the region of the cutting corners having an acute angle in each case at their intersection with the angle bisector and at a distance b from the end point of the associated cutting edge in the region of the cutting corners having an obtuse angle in each case at their intersection with the angle bisector, b being greater than a, in that an imaginary straight connecting line of these intersections, if the associated cutting edge runs rectilinearly in a plane perpendicular to the locating surface, has a maximum angular deviation of 5° from said cutting edge in this plane or, if the associated cutting edge runs in a curved manner in the plane perpendicular to the locating surface, has a maximum angular deviation of 5° from an imaginary straight connecting line of the starting point and the end point of said cutting edge in this plane, wherein the intersection with the angle bisector of the cutting corner having an acute angle, with respect to the locating surface, lies at the same height as the starting point of the cutting edge or lies deeper than said starting point by up to a maximum of 6% of the length of the associated cutting edge.

The configuration according to the invention ensures that the intersection curve between the chip breaker groove and the center part is largely adapted to the respective course of the cutting edge, thereby resulting in excellent chip breaking behavior at low cutting forces.

It is also especially advantageous in this case if, as seen in plan view, the intersection curve does not overlap the imaginary straight connecting line between the intersection of the angle bisector in a cutting corner having an acute angle with the intersection curve and the intersection of the angle bisector in a cutting corner having an obtuse angle with the intersection curve in the direction of the associated cutting edge at any point by more than 10% of the length of the associated cutting edge. As a rule, slight overlaps will occur only in the regions of the cutting corners, since the center part in the region of the cutting corners cannot be designed to be too narrow and with too great a taper.

Furthermore, it is advantageous if the cutting edges, with the exception of the cutting corners, are each provided with a bevel which has a maximum angular deviation of 10° with respect to the locating surface and a width of between 0.5% and 3% of the length of the associated cutting edge. As a result, during the cutting, low cutting forces and good chip breaking, combined with high resistance to chipping of the cutting edges, especially when boring out bores, are achieved.

Especially good cutting results are achieved when the rake face encloses in its falling region an angle of 10°-25° with a line parallel to the locating surface. This configuration helps to ensure that the cutting forces remain small and good chip breaking is achieved even at high feed rates during boring and turning, such that a high dimensional accuracy and good surface quality of the machined workpieces is achieved.

When establishing the intersection curve, it is advantageous if its spacing distance a is within the range of 1% to 20% and the spacing distance b is within the range of 10% to 40% of the length of the associated cutting edge.

This design ensures that there is sufficient space for the chips even at large depths of cut during turning and boring.

It is also favorable if the intersection of the angle bisector of the cutting corners having an obtuse angle with the deepest point of the rake face is in each case at a distance c from the end point of the associated cutting edge, which distance c is within the range of 10% to 25% of the length of the associated cutting edge. The advantage of this design lies in a smooth cut and once again sufficient space for the chips generated.

If the imaginary straight connecting line between the intersection of the intersection curve with the angle bisector of the cutting corner having an acute angle and the intersection of the angle bisector of the cutting corner having an obtuse angle with the deepest point of the rake face, if the associated cutting edge runs rectilinearly in a plane perpendicular to the locating surface, has a maximum angular deviation of 5° from said cutting edge in this plane or, if the associated cutting edge runs in a curved manner in the plane perpendicular to the locating surface, has a maximum angular deviation of 5° from an imaginary straight connecting line between the starting point and the end point of said cutting edge in this plane, low cutting forces likewise occur and good chip forming is achieved.

If the center part has a flat center region, marked improvements in the production of the indexable insert are obtained.

If one or more knob-shaped prominences are arranged adjacent to the center part in the region of the cutting corner having an acute angle in the direction of the angle bisector, good chip breaking behavior at smaller depths of cut is achieved.

It is especially advantageous if, as seen in plan view, the intersection curve runs in a wavelike manner along the cutting edges, as viewed from the center of the indexable insert towards the respective cutting edge, with a wave crest in the region of the center of the cutting edge and wave troughs towards the regions of the cutting corners.

This measure also contributes to improved chip breaking behavior and greater stability of the indexable insert combined with good manufacturability.

Other features which are considered as characteristic for the invention are set forth in the appended claims.

Although the invention is illustrated and described herein as embodied in indexable insert, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
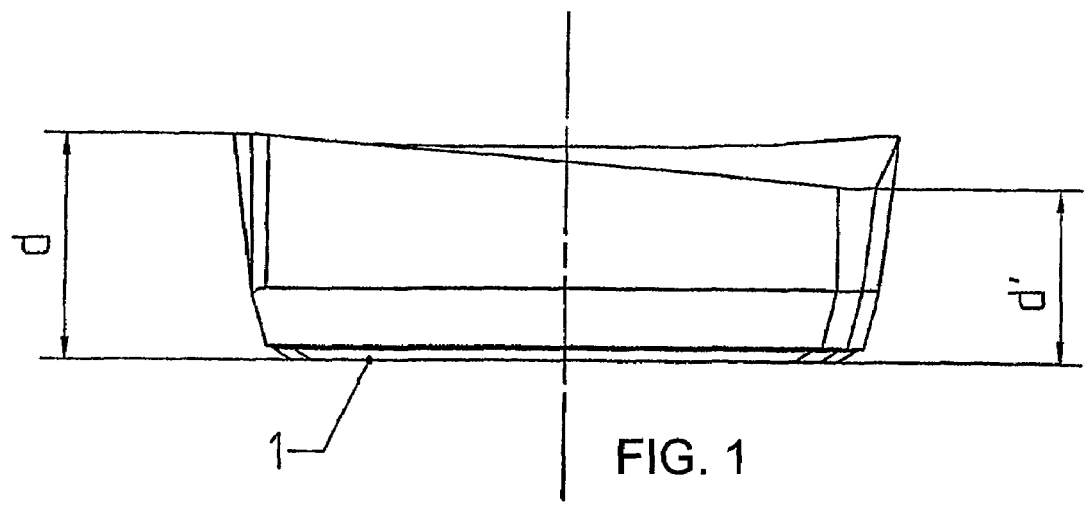
FIG. 1 is a side view of an indexable insert according to the invention.
Figure 2:
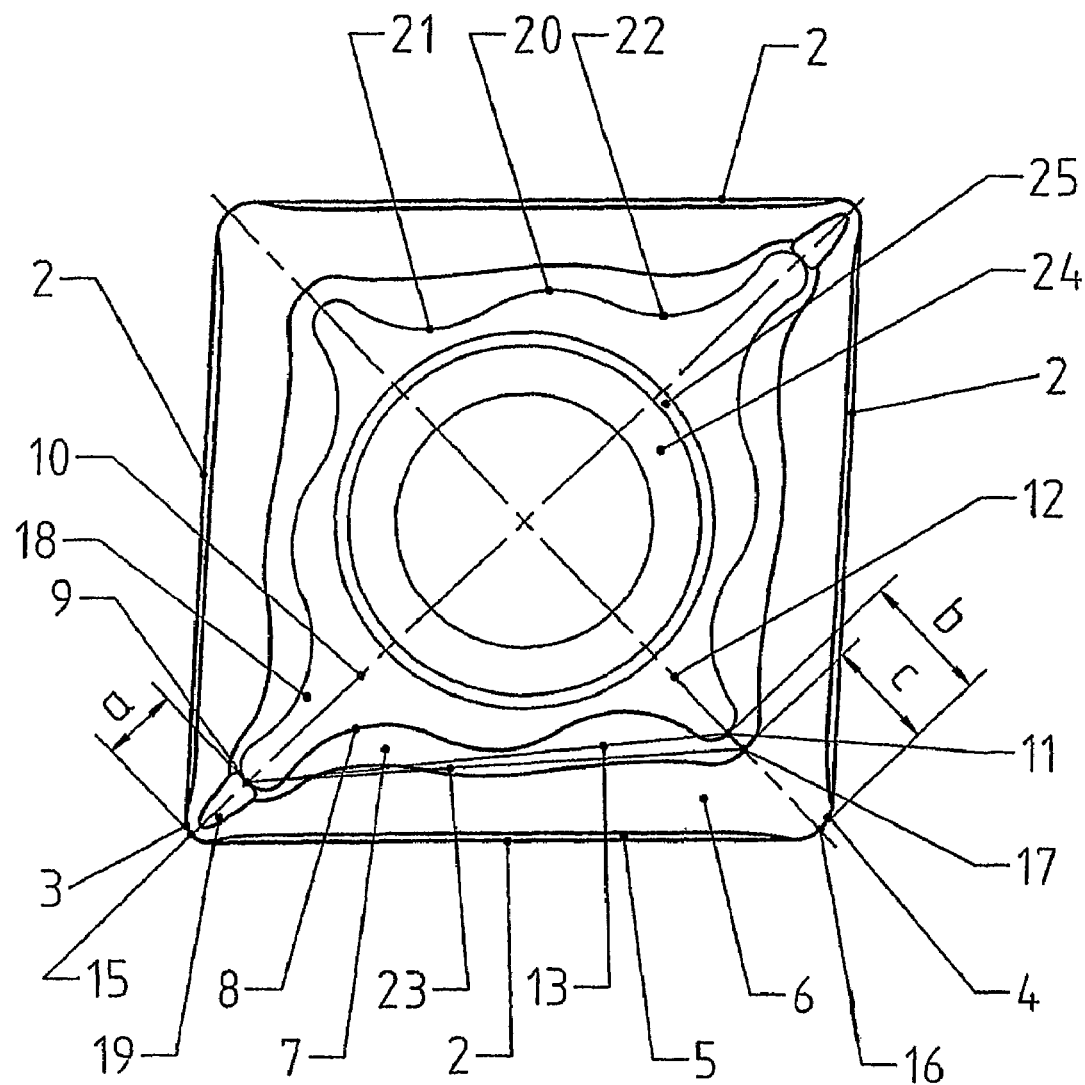
FIG. 2 is a plan view onto the indexable insert according to FIG. 1.
Figure 4:
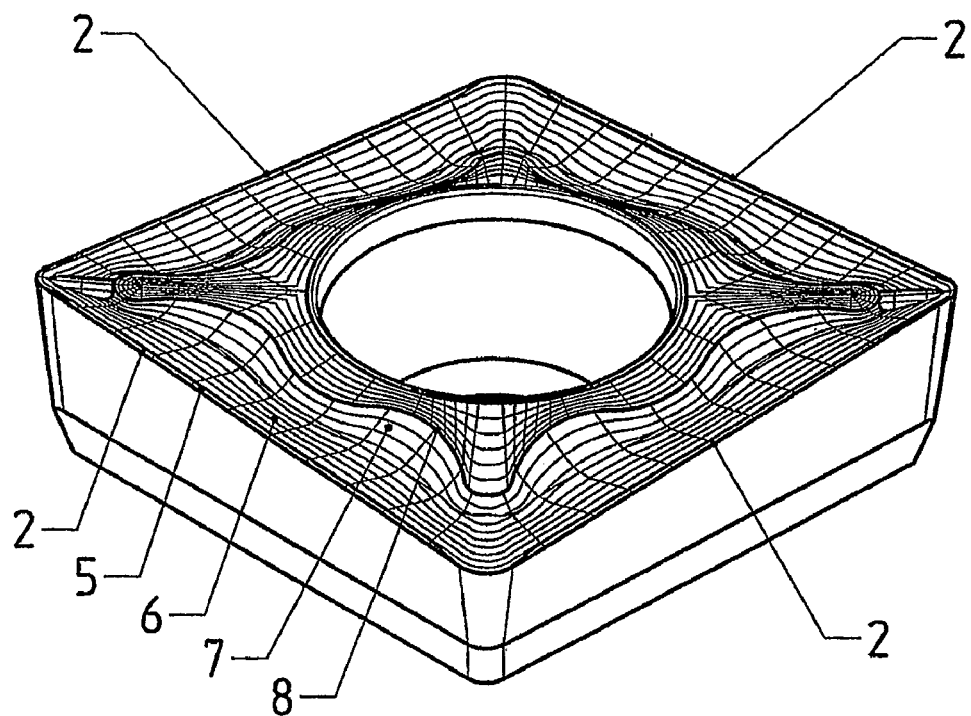
FIG. 4 is a perspective view of the indexable insert according to FIG. 1 and FIG. 2, illustrated with topology surface lines.

Referring now to the figures of the drawing in detail, FIGS. 1, 2 and 4 illustrate a rhombic indexable insert according to the invention having four equally long, substantially straight cutting edges 2 and a flat locating surface 1. At the corners of the indexable insert, the cutting edges 2 merge into two opposite, circular-arc-shaped cutting corners 3 having acute corner angles of in each case 88° and into two opposite, circular-arc-shaped cutting corners 4 having in each case obtuse angles of 92°. The indexable insert has its greatest thickness d at the cutting corners 3 having cutting edges 2 converging at an acute angle, whereas it has a smaller thickness d' at the cutting corners 4 having cutting edges 2 converging at an obtuse angle. In a plane perpendicular to the locating surface 1 outside the cutting corners 3, 4, the cutting edges 2 correspondingly run as a sloping straight line.

Outside the cutting corners 3, 4, the cutting edges 2 are provided with bevels 5 which run inclined at an angle of 5° with respect to the locating surface 1. The indexable insert has a rake face 6 adjoining the cutting corners 3, 4 and the bevels 5, this rake face 6 first of all falling and then rising with a back region 7 with respect to the locating surface 1. The rising back region 7 of the rake face 6 forms together with the center part 18 of the indexable insert an intersection curve 8. This intersection curve 8 runs in such a way that it is at a respective distance a from the starting point 15 of the associated cutting edge 2 in the respective regions of the cutting corners 3 at the intersection 9 with the associated angle bisector 10. The intersection curve 8 is at a respective distance b from the end point 16 of the associated cutting edge 2 in the respective regions of the cutting corners 4 at the intersection 11 with the associated angle bisector 12, said distance b being greater than the distance a. If the adjacent intersections 9 and 11 are in each case connected by an imaginary straight line 13, these straight lines 13 may have a maximum angular deviation of 5° from the respectively associated cutting edge 2 in a plane perpendicular to the locating surface 1.

Figure 3:
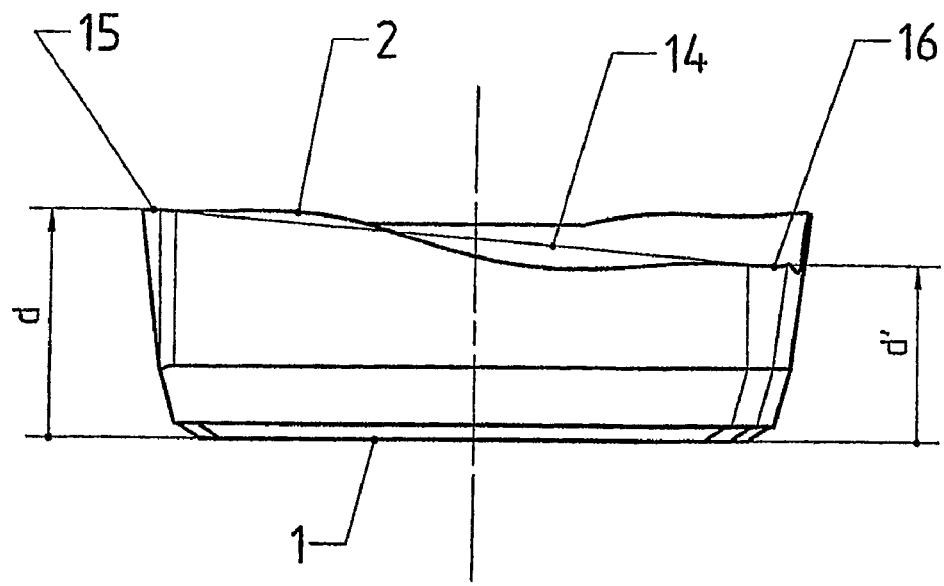
FIG. 3 is a side view of an alternative embodiment of the indexable insert according to the invention.

In the case of cutting edges 2 which run in a curved manner in the plane perpendicular to the locating surface 1, as shown in FIG. 3, the maximum permissible angular deviation of the straight line 13 is in each case established relative to an imaginary straight connecting line 14 which connects the starting point 15 and the end point 16 of the respective cutting edge 2. The respective intersections 9 lie relative to the associated starting points 15 of the cutting edges 2 either at the same height or deeper by up to a maximum of 6% of the length of the cutting edge 2. In the respective region of the cutting corner 4, the intersection 17 between the angle bisector 12 and the deepest point of the rake face is at a distance c from the end point 16 of the associated cutting edge 2, and this distance c must be within the range of 10% to 25% of the length of the associated cutting edge 2. The indexable insert has a center hole 24 which runs out conically towards the center region 18. The center region 18 itself runs away from the intersection curve 8 in a slightly rising manner towards the center hole 24 and leads into a flat shoulder surface 25 which runs concentrically to the conical region of the center hole 4 and parallel to the locating surface 1. As viewed from the center hole 24 towards the respective cutting edge 2, the intersection curve 8 runs in a wavelike manner along the respective cutting edge 2, a wave crest 20 being provided in the region of the center of the cutting edge and wave troughs 21 and 22 being provided towards the regions of the cutting corners 3 and 4. In the regions of the cutting corners 3, a respective knob-shaped prominence 19 is arranged directly adjacent to the center region 18 and reaches directly up to the respective circular cutting corner 3.

Figure 5:
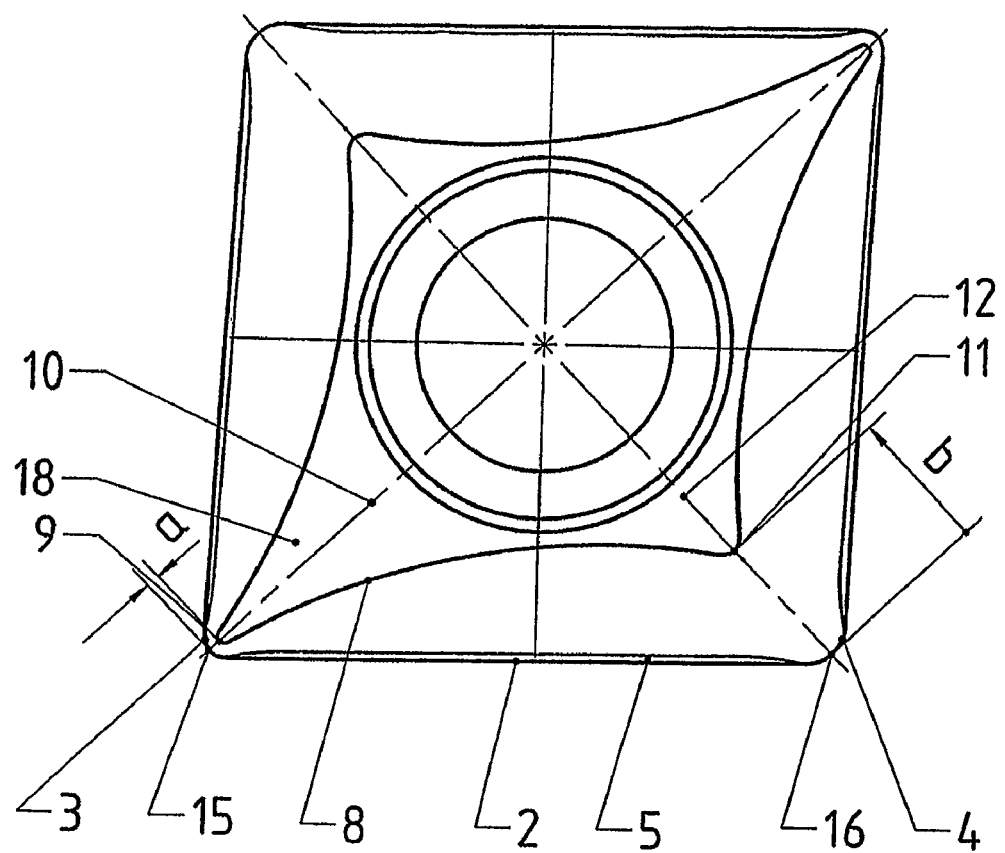
FIG. 5 is a plan view of a further variant of an indexable insert according to the invention.

Shown in FIG. 5 is the variant of a rhombic indexable insert according to the invention, in which variant the intersection curve 8 does not run in a wavelike manner with respect to the associated cutting edge 2 but rather in a continuously curved manner. In addition, no raised knob 19 is provided in the region of the cutting corner 3, but rather the center region 18 itself reaches there directly up to the circular cutting corner 3.

Figure 6:
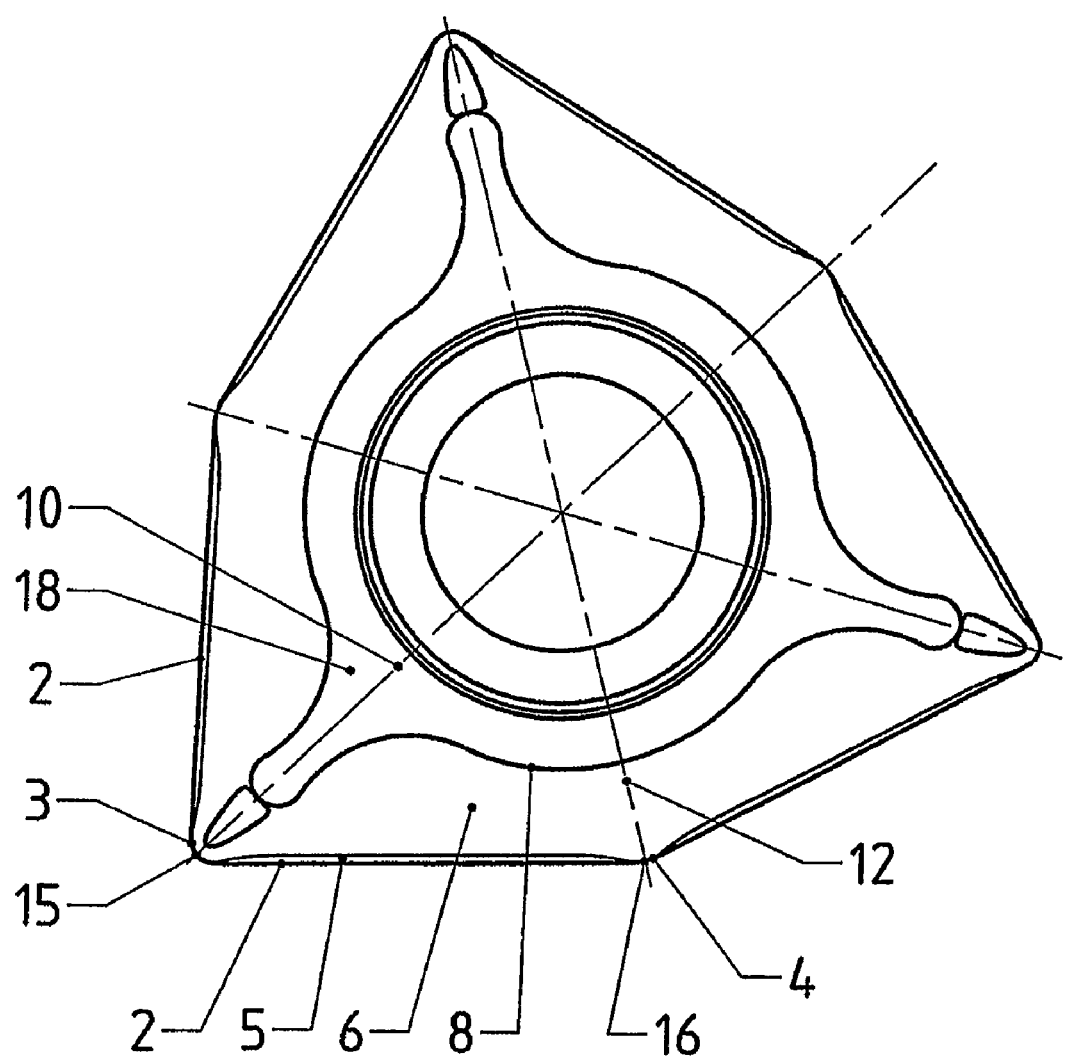
FIG. 6 is a plan view of a third variant of an indexable insert according to the invention.

FIG. 6 illustrates a variant of the indexable insert according to the invention of hexagonal basic form in which the intersection curve 8 again runs in a wavelike manner with respect to the associated cutting edge 2, but in such a way that there is a wave trough towards the region of the respective cutting corner 3, whereas the highest point of a wave crest is present at the respective cutting corner 4.

The invention claimed is:

1. A polygonal indexable insert, comprising:
   a flat locating surface and cutting edges on a top side connected to one another by two or more cutting corners having acute angles of less than 89° and obtuse angles of more than 91° following one another alternately, said cutting edges running rectilinearly or curved relative to said flat locating surface to define a thickness d of the indexable insert at said cutting corners having an acute angle greater than a thickness d' of the indexable insert at said cutting corners having an obtuse angle;
   in a plan view, said cutting edges merging into a rake face which, with respect to said flat locating surface, first falls inward and then rises with a slope region and then forms an intersection curve together with a center part of the indexable insert, said intersection curve running at a distance a from a starting point of the associated said cutting edge in a region of said cutting corners having the acute angle in each case at their intersection with the angle bisector and at a distance b from an end point of the associated said cutting edge in the region of said cutting corners having the obtuse angle in each case at their intersection with the angle bisector, the distance b being greater than the distance a;
   an imaginary straight connecting line between said intersections, if the associated said cutting edge runs rectilinearly in a plane perpendicular to said flat locating surface, having a maximum angular deviation of 5° from said cutting edge in said plane or, if the associated said cutting edge runs in a curved manner in said plane perpendicular to said flat locating surface, having a maximum angular deviation of 5° from an imaginary straight connecting line of said starting point and said end point of said cutting edge in said plane; and
   wherein said intersection, with respect to said flat locating surface, lies at an equal height as said starting point of said cutting edge or lies deeper than said starting point by no more than a maximum of 6% of a length of the associated said cutting edge.

2. The indexable insert according to claim 1, wherein, as seen in a plan view, said intersection curve does not overlap said imaginary straight connecting line in the direction of the associated said cutting edge at any point by more than 10% of the length of the associated said cutting edge.

3. The indexable insert according to claim 1, wherein said cutting edges, except at said cutting corners, are each formed with a bevel having a maximum angular deviation of 10° with respect to said flat locating surface and a width of between 0.5% and 3% of the length of the associated said cutting edge.

4. The indexable insert according to claim 1, wherein said rake face has a falling region enclosing an angle of 10°-25° with a line parallel to said flat locating surface.

5. The indexable insert according to claim 1, wherein said distance a lies within a range of 1% to 20% and said distance b lies within a range of 10% to 40% of the length of the associated said cutting edge.

6. The indexable insert according to claim 1, wherein an intersection of the angle bisector of said cutting corners with the obtuse angles and a lowest point of said rake face lies at a distance c from an end point of the associated said cutting edge, and the distance c lies within a range of 10% to 25% of the length of the associated said cutting edge.

7. The indexable insert according to claim 6, wherein an imaginary straight connecting line between said intersection at said angle bisector at the acute angle cutting corner and said intersection of said angle bisector at said obtuse angle cutting corners and the lowest point of said rake face, if the associated cutting edge runs rectilinearly in a plane perpendicular to the locating surface, has a maximum angular deviation of 5° from said cutting edge in said plane or, if the associated said cutting edge runs curved in the plane perpendicular to the locating surface, has a maximum angular deviation of 5° from an imaginary straight connecting line between the starting point and the end point of said cutting edge in said plane.

8. The indexable insert according to claim 1, wherein said center part is formed with a flat center region.

9. The indexable insert according to claim 1, which comprises one or more knob-shaped protuberances formed adjacent said center part in a region of said cutting edges in a direction of said angle bisector.

10. The indexable insert according to claim 1, wherein, as seen in a plan view, said intersection curve runs in a wavy course along said cutting edges, as viewed from the center of the indexable insert towards the respective said cutting edge, with a wave crest at a center of said cutting edge and wave troughs in a vicinity of said cutting corners.

* * * * *